No. 736,280. PATENTED AUG. 11, 1903.
L. LYNDON.
REGULATING SYSTEM OF ELECTRIC DISTRIBUTION.
APPLICATION FILED SEPT. 18, 1902.
NO MODEL.
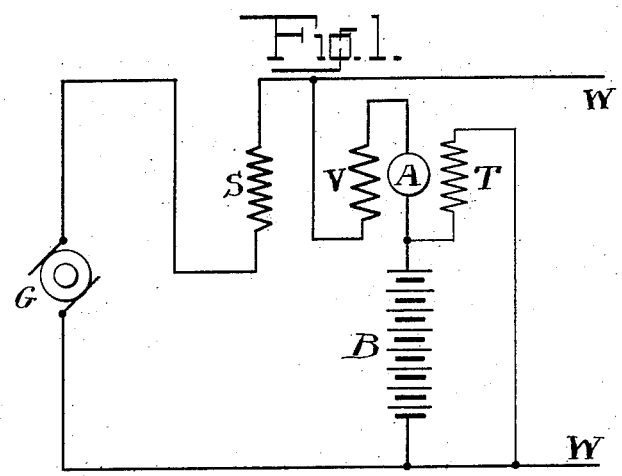
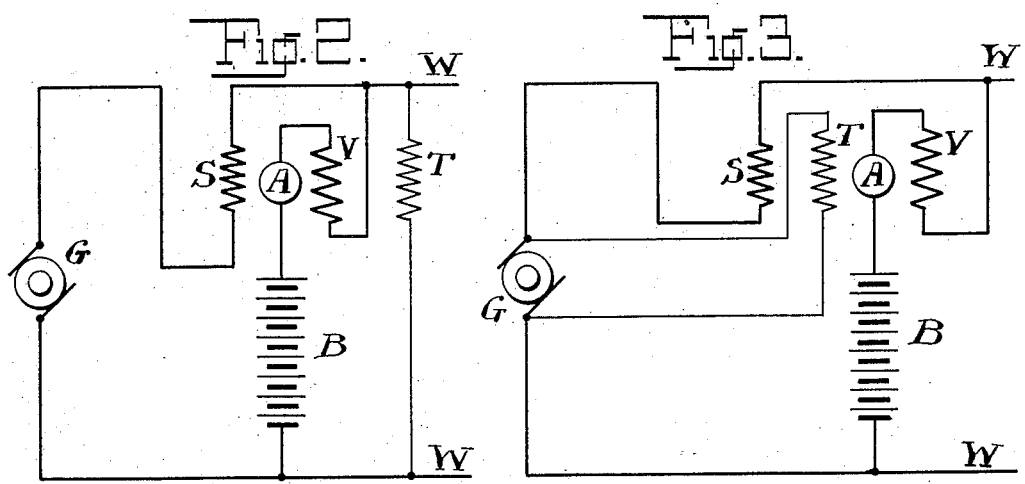
Witnesses
Jos. J. Liner
H. C. Workman
Inventor
Lamar Lyndon
By his Attorneys No. 736,280. Patented August 11, 1903.

UNITED STATES PATENT OFFICE.

LAMAR LYNDON, OF NEW YORK, N. Y., ASSIGNOR TO NATIONAL BATTERY COMPANY, OF BUFFALO, NEW YORK, A CORPORATION OF NEW JERSEY.

REGULATING SYSTEM OF ELECTRIC DISTRIBUTION.

SPECIFICATION forming part of Letters Patent No. 736,280, dated August 11, 1903.

Application filed September 18, 1902. Serial No. 123,899. (No model.)

*To all whom it may concern:*

Be it known that I, LAMAR LYNDON, a citizen of the United States, residing at New York, in the county and State of New York, have invented a new and useful Regulating Systems of Electric Distribution, of which the following is a specification.

My invention relates to self-regulating systems of electric-current generation and distribution in which a storage battery and booster are inserted to absorb the fluctuations in the load; and it has for its object the even regulation of the generator output and battery charge and discharge and to insure responsive action of the latter to load fluctuations.

Figure 1 is a diagrammatic view showing one form of my invention in which a booster field-coil is connected across the battery-terminals. Fig. 2 shows a modification in which the booster field-coil is connected across the line. Fig. 3 is a modification showing a booster field-coil connected across the generator-terminals.

In the drawings, G represents the generator; W W, the work-circuit; B, the storage battery; A, the booster.

According to my invention I provide the booster with balanced field-coils S and T, influencing the booster to generate electromotive force in opposite directions. Under normal conditions these coils are so arranged as to neutralize each other in their effect, so that the booster generates no electromotive force. The booster field-coil T may be connected, as shown in Fig. 1, across the battery-terminals, or, as shown in Fig. 2, across the work-circuit, or, as shown in Fig. 3, across the generator-terminals. The booster field-coil S is a series coil in the generator-circuit responsive to load changes in the work-circuit and influencing the booster to generate electromotive force in the same direction as the battery electromotive force and assisting or tending to discharge the battery. According to my invention I also provide a booster field-coil V in series in the booster-circuit. This coil influences the booster to generate electromotive force in either direction, according as the battery charges or discharges, and to act as a steadying-coil for the booster, assisting it to respond to battery action.

The action of the system is as follows: Under normal conditions, as above stated, the booster field-coils S and T are balanced and the battery and booster are inactive. Upon an increase in the external load the increased current circulating through S overbalances the effect of coil T and causes a booster electromotive force to the line, assisting the battery to discharge. Upon a decrease in the external load the effect of coil T overbalances the effect of coil S by reason of the decrease of the current flowing through coil S. Coil T therefore induces a booster electromotive force to cause a charging-current to flow through the battery. It will thus be seen that my invention provides a self-regulating system in which the booster and storage battery are rendered sensible and equally responsive to fluctuation in the load.

Having thus described my invention, the following is what I claim as new therein and desire to secure by Letters Patent:

1. A self-regulating system for current distribution comprising a generator, a work-circuit, a storage battery and booster, said booster having balanced field-windings responsive to load fluctuations and means responsive to the action of the battery and booster to vary the booster electromotive force.

2. A self-regulating system for current distribution comprising a generator, a work-circuit, a storage battery and booster, a field for the booster responsive to load fluctuations and inducing under normal load conditions equal and opposite electromotive forces in the booster-armature, and a booster field-coil in series in the booster-circuit.

3. A self-regulating system for current distribution comprising a generator, a work-circuit, a storage battery and booster, field-coils for the booster tending under normal load conditions to induce equal and opposite electromotive forces in the booster-armature, one of said coils in series in the generator-circuit and a booster field-coil in series in the booster-circuit.

4. A self-regulating system for current distribution comprising a generator, a work-circuit, a storage battery and booster, field-coils for the booster tending under normal load conditions to induce equal and opposite electromotive forces in the booster - armature, one of said coils in series in the generator-circuit and tending to induce a booster electromotive force to discharge the battery, and a booster field-coil in series in the booster-circuit.

5. A self-regulating system for current distribution comprising a generator, a work-circuit, a storage battery and booster, field-coils for the booster tending under normal load conditions to induce equal and opposite electromotive forces in the booster - armature, one of said coils in series in the generator-circuit, and another of said coils energized from any convenient source of current, and a booster field-coil in series in the booster-circuit.

6. A self-regulating system for current distribution comprising a generator, a work-circuit, a storage battery and booster, field-coils for the booster tending under normal load conditions to induce equal and opposite electromotive forces in the booster - armature, one of said coils in series in the generator-circuit and tending to induce a booster electromotive force to discharge the battery, another of said coils connected across the battery and tending to assist the battery to charge, and a booster field - coil in series in the booster-circuit.

LAMAR LYNDON.

Witnesses:
J. GREEN,
H. C. WORKMAN.